Figure 1:
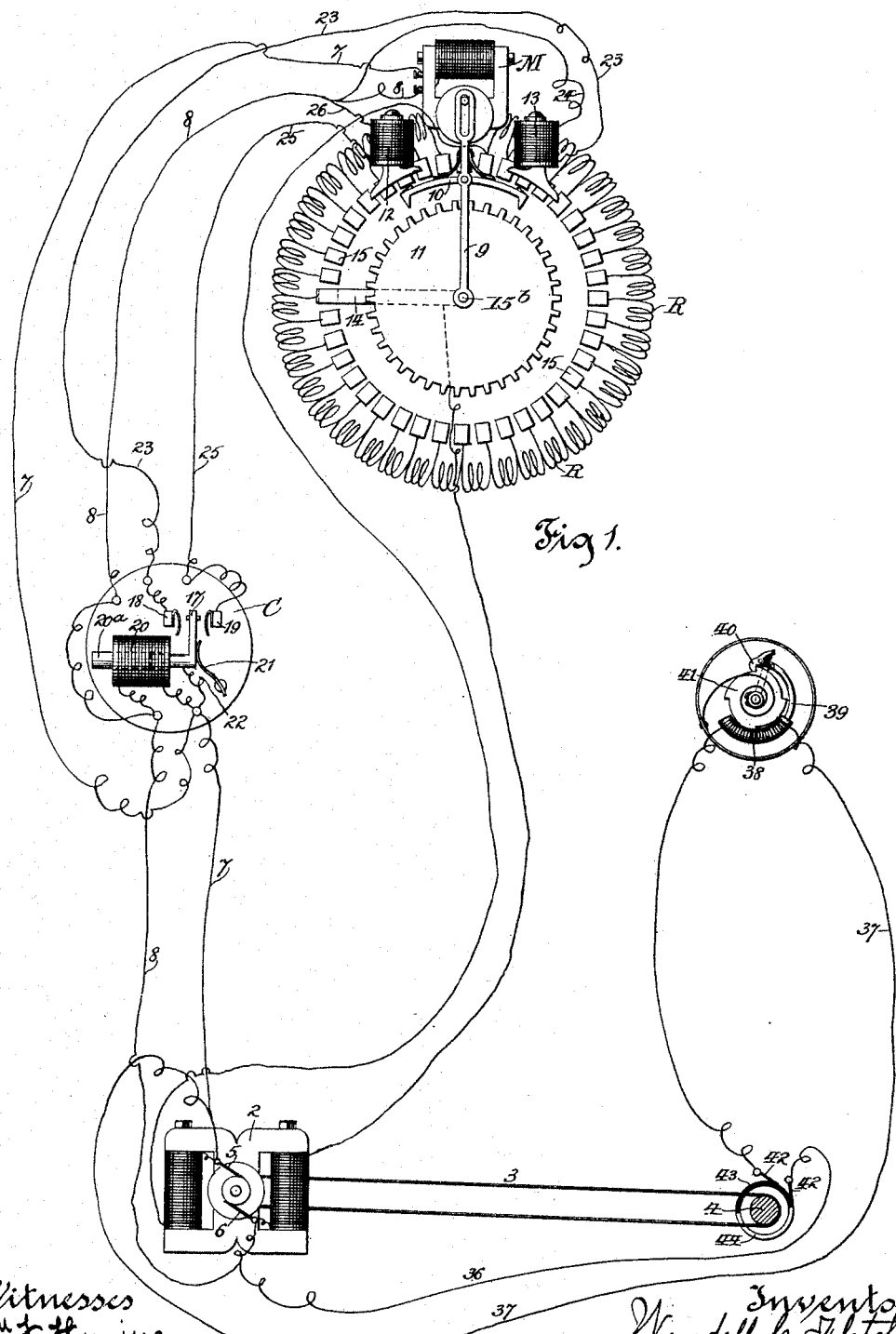

(No Model.) 2 Sheets—Sheet 1.

W. C. FLETCHER.
AUTOMATIC SPEED INDICATOR AND RECORDER.

No. 492,493. Patented Feb. 28, 1893.

Witnesses
Wm. F. Huning
Wm. N. Rheem

Inventor
Wendell C. Fletcher
by Raymond & Veeder Attorneys.

THE NORRIS PETERS CO., PHOTO-LITHO., WASHINGTON, D. C.

(No Model.) 2 Sheets—Sheet 2.
W. C. FLETCHER.
AUTOMATIC SPEED INDICATOR AND RECORDER.
No. 492,493. Patented Feb. 28, 1893.
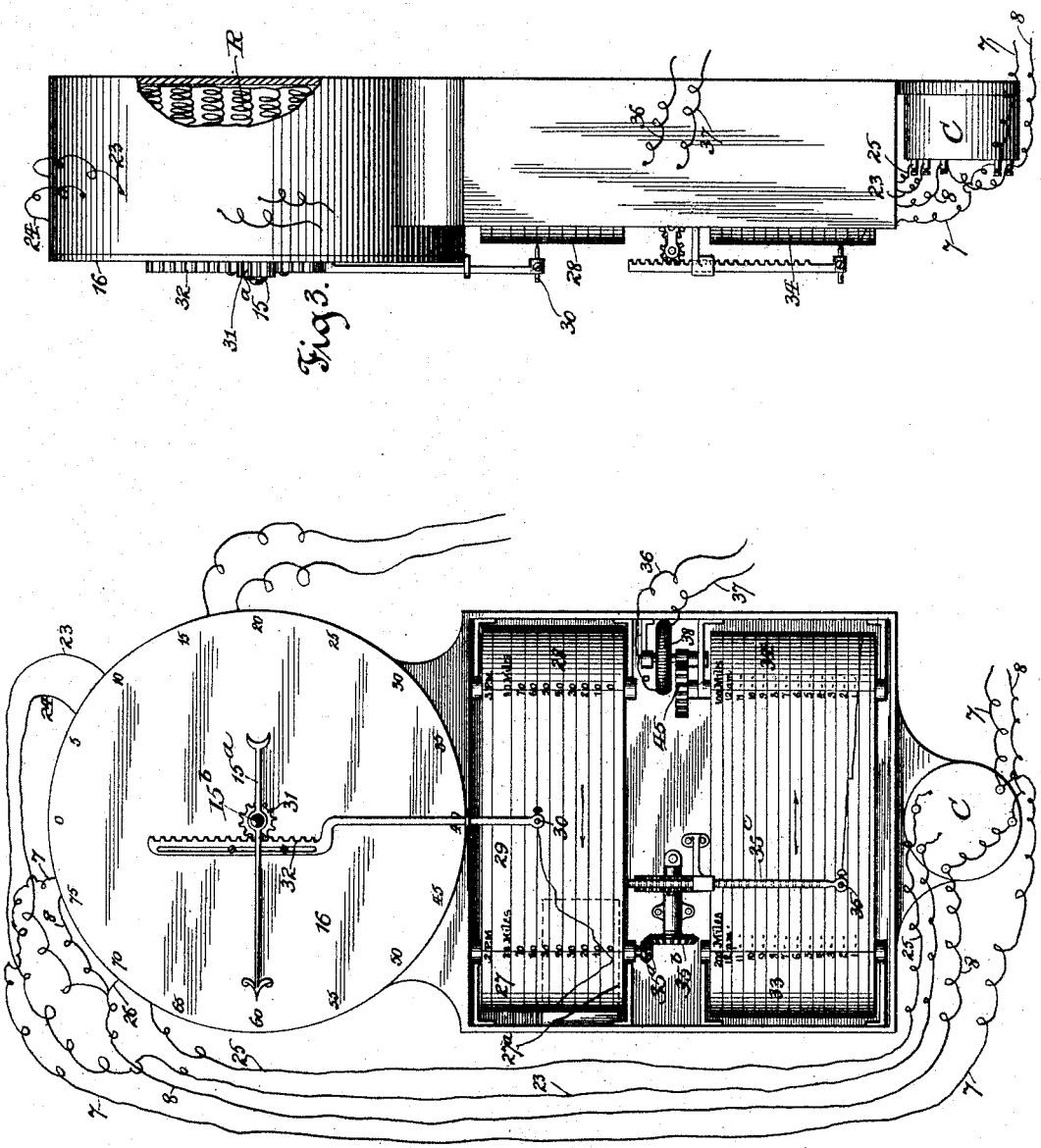

UNITED STATES PATENT OFFICE.

WENDELL C. FLETCHER, OF ST. LOUIS, MISSOURI, ASSIGNOR TO NORMAN P. WILLARD, TRUSTEE, OF CHICAGO, ILLINOIS.

AUTOMATIC SPEED INDICATOR AND RECORDER.

SPECIFICATION forming part of Letters Patent No. 492,493, dated February 28, 1893.

Application filed April 29, 1892. Serial No. 431,200. (No model.)

*To all whom it may concern:*

Be it known that I, WENDELL C. FLETCHER, a citizen of the United States, residing at St. Louis, in the State of Missouri, have invented certain new and useful Improvements in Automatic Speed Indicators and Recorders, of which the following is a specification, reference being had to the accompanying drawings.

The object of my invention is to provide an indicator which will show the speed at which a vehicle is traveling and which will also make a record of such speed and of the distance traveled from the starting point. To this end I employ a small dynamo whose speed is proportioned to that of the vehicle and which has suitable regulating apparatus, in conjunction with clock work by which movement is given to the recording apparatus.

In the accompanying drawings: Figure 1 is a diagrammatic view showing the principal parts employed and the circuits which connect them. Fig. 2 is an elevation of the recording and indicating instrument, a portion of the case being removed in order to show the interior mechanism. Fig. 3 is an edge view of the same, a portion of the case being broken away to show the interior.

2 is a small dynamo which is connected by the belt 3 to the revolving axle 4 of the vehicle, the speed of the dynamo being thus proportioned to the speed of the vehicle. The dynamo is shunt wound, and connected to the field magnet coils is a series of resistances R by which the current passing through the field coils can be regulated. From the commutator brushes 5, 6 of the dynamo extend the wires 7 and 8 which are connected to a small motor M. Said motor operates a vibrating arm 9 to which is attached a pawl 10. Pivoted upon the same center as the arm 9 is a toothed wheel 11. The pawl 10 is normally held in a middle position as shown, but either end may be made to engage with the teeth of the wheel 11 by means of electro magnets 12 and 13. The cores of said magnets are preferably made to conform to the arc of the circle in which the pawl 10 vibrates, and the pawl is either made of iron or is provided with iron armatures which will be attracted by the magnets when the latter are energized.

Connected in shunt with the wires 7 and 8 is a current regulator C which may be of any well known description. As shown, it consists of an armature 17 which is normally held midway between the contacts 18 and 19 through the opposing influences of the magnet coils 20 acting on the core $20^a$ connected to the armature and the spring 21. When the current from the dynamo increases owing to its increased speed, the magnet becomes strong enough to overcome the spring and connection is made with the contact 19. A current is thus allowed to pass through the wire 22, armature 17, wire 25, coil of magnet 12, and thence through wire 26 to the return wire 8. When the current falls below the normal strength owing to the diminished speed of the vehicle, the spring 21 will prevail against the electro magnet and a circuit will be formed through the armature 17 and the contact 18, thence through the wire 23 to the magnet coil 13, and from the magnet coil 13 by the wire 24 to the return wire 8 as before.

The effect of passing a current through either coil 12 or 13 is to make the pawl 10 act upon the toothed wheel 11 which carries the switch 14, the latter being thus shifted in one direction or the other. The outer end of said switch-arm makes contact with one of the series of blocks 15 to which the resistance coils R are connected and the number of resistance coils in circuit with the field magnet coils is accordingly varied by the shifting of said switch. The effect of such variation is to increase or diminish the strength of the field and thus to restore the current from the dynamo to its normal amount. As the speed of the dynamo increases the amount of resistance introduced into the field coils will be increased and vice versa. The position of the arm 14 will thus be varied accordingly as the speed of the dynamo and of the vehicle which drives it is varied, and a pointer connected to said switch will therefore indicate the speed of the vehicle. Such a pointer is shown at $15^a$ in Fig. 2 as mounted on the same shaft $15^b$, that carries the switch arm 14, and a dial 16 is shown over which the pointer moves, the graduations on the dial indicating the speed in miles per hour. The effect of a current through the magnet 12 will be to revolve the pointer $15^a$ in a direction to indicate an increased speed, while the passage of the current through the magnet 13 will revolve the pointer in a direction to indicate a diminution of speed.

In order to make a record of the speed I provide a drum 27 which is driven by suitable clock-work the situation thereof being indicated by the dotted lines 27ª. Beside the drum 27 is a second drum 28 and a strip of paper 29 is fed from one drum to the other as the latter is driven by the clock-work. This strip is ruled horizontally and vertically, the horizontal lines being marked with the speed in miles per hour and the vertical lines denoting time divisions. A marking pen or point 30 connected to the speed indicating mechanism in any suitable manner as by pinion 31 and rack 32, rises and falls as the speed increases or diminishes. The result will be the tracing of a broken line as shown at the left of the marking point in Fig. 2 which records the speed at any given moment.

In addition to providing for the recording of the speeds, I provide for recording the total distance traversed by means of a second pair of drums 33, 34 which carry a strip of paper ruled both vertically and horizontally. In this case, however, the divisions of the horizontal lines represent miles and the divisions of the vertical lines represent time. Connected by suitable gearing 35ª, 35ᵇ, and a sliding arm 35ᶜ to the clock-work which drives the upper drums is a marking point 35, which, as time lapses, gradually rises so that the vertical height of the marking point indicates the hour. The horizontal movement of the paper through the rotation of the drum is effected by an electrical connection to the axle 4 of the vehicle and to the dynamo 2 which furnishes the current to the indicating mechanism. A branch circuit is led off from the dynamo through wires 36, 37 (Fig. 1). Included in the circuit is a magnet coil 38 which actuates a soft iron core 39 provided with a pawl 40. Said pawl works in a ratchet wheel 41, the arrangement of parts being such that when the current is passed through the coil 38 the core 39 is drawn in and the wheel 41 thereby revolved. When the circuit is broken so that the current ceases to flow through the coil 38 the core 39 returns to its original position and its pawl engages with the next tooth in the wheel 41. The circuit is alternately made and broken at each revolution of the axle 4 by means of the brushes 42 which are placed in the circuit and which bear upon a ring attached to the axle consisting in part of an insulating material 43 and in part of a conductor 44. When both brushes are on the conductor the circuit is complete and when one or both have reached the insulator 44 the circuit is broken.

Any device may be used for supporting the core 39 so that it will vibrate freely and no detailed illustration is made of such device as it may be easily constructed by any skilled mechanic. The movement of said wheel 41 is conveyed to one of the drums 33 or 34 by any suitable means, such as the gearing 45 shown in Fig. 2.

While I have described the device in connection with a moving vehicle as a speed and distance recorder, it is evident that it may be used for any analogous purpose, as for instance, to ascertain the rate of revolution of a shaft and the total number of turns that it makes. Essentially, these are the primary facts on which its indications and record are founded; and any measurements dependent upon these can be indicated directly by suitably divided dials.

I claim—

1. The combination, in a speed indicator, of a dynamo whose speed is proportional to the speed to be indicated; means for maintaining a constant current from said dynamo; and speed indicating devices connected to the said regulating means, substantially as described.

2. The combination, in a speed indicator, of a shunt wound dynamo whose speed is proportioned to that which is to be measured; means for varying the resistance through the field coils of said dynamo; a regulator for governing the current from said dynamo by altering the resistance through said field coil; an indicator whose movements correspond to those of the regulator switch; and a dial or scale over which said indicator moves graduated to show the speed to be measured, substantially as described.

3. The combination, in a speed indicator, of a shunt wound dynamo whose speed of revolution is proportioned to the speed to be measured; a variable resistance in circuit with the field coils of said dynamo; a switch by which said resistances may be varied; means for operating said switch consisting of a motor actuated by said dynamo; a vibrating arm actuated by said motor and carrying a pivoted pawl; a toothed wheel in proximity to said pawl; and magnets adapted to bring said pawl into action and move said wheel in one direction or the other as the current in said dynamo is increased or diminished; and a pointer operated by said wheel and which moves over a dial graduated to show the speed to be measured, substantially as described.

4. The combination, in a speed indicator, of a shunt wound dynamo 2; a motor N; resistances R in series with the field coils of the dynamo; a switch arm 14 by which a greater or less resistance may be interposed in the field magnet circuit; a vibrating arm 9 having its pivot concentric with the toothed wheel 11 and having a pawl 10 in proximity to said toothed wheel; magnets 12 and 13 adapted to put said pawl into action to drive the wheel 11 in one direction or the other as one magnet or the other is energized; a current regulator C adapted to send a current through the magnet 12 or 13 accordingly as the current through the dynamo is increased or diminished; and an indicator connected to said wheel 11 and co-acting with a dial or scale graduated to show the speed to be measured, substantially as described.

5. The combination, in a speed indicator and recorder of a shunt wound dynamo whose speed of revolution is proportioned to the speed to be measured; a variable resistance in series with the field coils of said dynamo; a switch governing said variable resistance and connected to a regulator by which the current from said dynamo is made constant; and speed indicating and recording devices connected to said switch, said recording devices consisting of a marking point corresponding in its movements to the movements of said switch and traversing a surface driven by clock-work and having graduations in one direction to show the time and in the other direction to show the speed, substantially as described.

6. The combination, in a speed indicating and recording instrument of a shunt wound dynamo driven by the shaft whose speed is to be recorded and provided with means for regulating the current from said dynamo; and speed indicating devices connected to said regulating means whereby the position of the switch governing said regulating means, will be made to indicate the speed at which said dynamo and the shaft from which it is driven, is revolving; and means for recording both the rate of speed and the total revolutions of said shaft; said means consisting of a drum and a marking point actuated by clock-work; and a second marking point and drum actuated by the dynamo, the marking point actuated by the dynamo co-operating with the drum actuated by the clock-work, and the marking point actuated by the clock-work co-operating with the drum actuated by the dynamo, the speed of the latter drum being governed by the speed of the shaft to be measured and the position of the marking point actuated by the dynamo being determined by the current regulating appliances of said dynamo, substantially as described.

WENDELL C. FLETCHER.

Witnesses:
J. H. CAVENDER,
L. THOMPSON.